Figure 1:
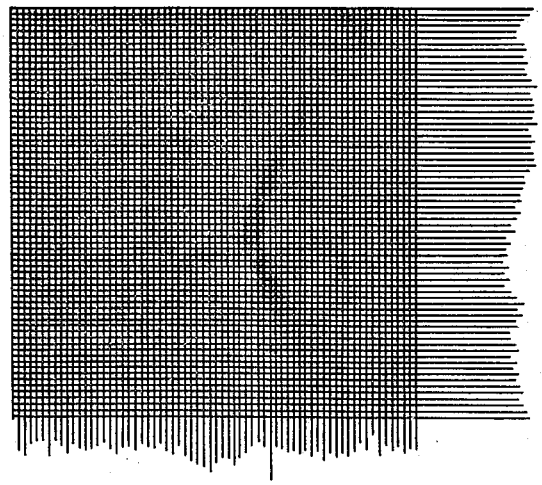

May 29, 1923.

L. T. FREDERICK

COMPOSITE PLATE

Filed May 12, 1919

1,456,884

WITNESSES:
J. A. Helsel.
O. E. Bee.

INVENTOR
Louis T. Frederick.
BY
Wesley G. Carr
ATTORNEY

Patented May 29, 1923.

1,456,884

UNITED STATES PATENT OFFICE.

LOUIS T. FREDERICK, OF WILKINSBURG, PENNSYLVANIA, ASSIGNOR TO WESTINGHOUSE ELECTRIC & MANUFACTURING COMPANY, A CORPORATION OF PENNSYLVANIA.

COMPOSITE PLATE.

Application filed May 12, 1919. Serial No. 296,660.

*To all whom it may concern:*

Be it known that I, LOUIS T. FREDERICK, a citizen of the United States, and a resident of Wilkinsburg, in the county of Allegheny and State of Pennsylvania, have invented a new and useful Improvement in Composite Plates, of which the following is a specification.

My invention relates to composite plates and it has, for its primary object, the construction of composite plates of fibrous material impregnated with a hardened binder which shall be suitable for manufacturing gears or other similar articles.

It has been found that composite plates constructed of sheets of ordinary paper, impregnated with a hardened binder, such as a phenolic condensation product, are not altogether suitable for the manufacture of gears of certain sizes and for certain uses. For example, while such material possesses relatively great mechanical strength, it is also comparatively brittle, and the latter characteristic precludes its utilization for the manufacture of gears and other machine element for certain classes of work.

One object of my invention, therefore, resides in the construction of composite plates by so employing fibrous material, such as paper, impregnated with a suitable binder and so associating the paper with the binder as to obtain such resiliency in the finished plates that they may be advantageously employed in the manufacture of self-sustaining gears or other like articles for general use.

With these and other objects in view, my invention will be more fully described, illustrated in the drawings, in the several views of which corresponding numerals indicate like parts, and then particularly pointed out in the claims.

Figure 2:
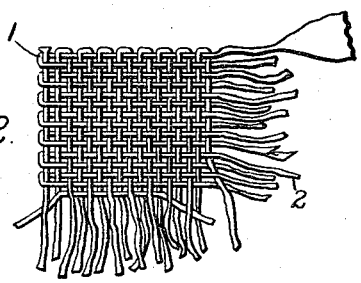
Figure 3:
Figure 4:
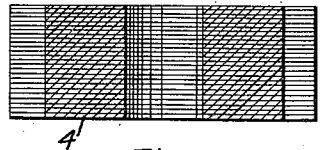

In the drawings, Fig. 1 is a diagrammatic view of a sheet of partially formed woven fabric of relatively fine fibres which may be employed in accordance with my invention; Fig. 2 is a fragmentary view of material similar to that shown in Fig. 1 but which differs therefrom in that the fibres are comparatively coarse; Fig. 3 is a sectional view of a composite plate constructed in accordance with my invention and Fig. 4 is a sectional view of a gear wheel constructed from a plate similar to that shown in Fig. 3.

In practising my invention, I may construct a composite plate, which is suitable for the manufacture of gear wheels or other similar articles, by employing fibrous material, such as paper. I prefer to employ a fibrous material having relatively long fibres and to utilize strands formed of such fibres and to weave them in any suitable manner to form a sheet of material of suitable dimensions. A sheet of the woven material may then be impregnated with a suitable binder, such as a phenolic condensation product, and the sheets may be stacked to a suitable thickness, after which they may be subjected to heat and pressure to compact the material and to harden the binder.

In Figs. 1 and 2, is shown a layer of material 1 formed of strands 2 which are woven in any suitable manner to form the sheet. The strands 2 may comprise a fibrous material preferably of relatively long fibres which are twisted or crimped together to form the strands. The strands 2 may also be formed of paper having relatively long fibres in its structure. The paper may be cut into comparatively narrow strips and such strips twisted or crimped to form the strands. The sheet 1 may be impregnated with a suitable binder in sufficient quantity so that when several of the sheets are stacked and subjected to sufficient heat and pressure, the interstices shall be filled with the binder which is first softened and subsequently hardened. A composite plate 3 formed by employing woven material in this manner may be machined to form a gear wheel 4, such as shown in Fig. 4.

By employing strands of paper woven to form a layer of material, I may overcome the objectionable characteristics possessed by paper in ordinary sheet form. It is well known that a sheet of paper, when subjected to a tensile strain tears suddenly when the ultimate strength of the paper has been reached. There is practically no stretch obtained before the paper tears and it is believed this condition exists on account of the fact that the strain is concentrated at certain points. On the other hand, it is readily appreciated that woven fabric gives or stretches to considerable extent before it breaks or tears. This is noticeable, for example, in two pieces of cloth, one of which has been cut straight and the other of which has been cut on the bias. The piece which is cut on the bias stretches to a much greater extent than the straight cut piece. I obtain this advantage, therefore, by employing a woven material of relatively long fibres without reducing its inherent mechanical strength. It is obvious that a distinct advantage is gained in manufacturing gear wheels if the gear wheels possess a certain degree of resiliency. This is true because of the fact that the gear teeth are not so easily sheared or broken off when subjected to sudden strains.

Furthermore, by employing a binder, such as a phenolic condensation product, great mechanical strength may be secured while, at the same time, obtaining sufficient resiliency. Although I prefer to employ relatively finely woven layers of material, the binder or phenolic condensation product, which is hardened in the interstices of the layers, adds to, rather than detracts from, the resiliency of the resulting plate, because the phenolic condensation product itself possesses a certain degree of resiliency. Furthermore, by employing a woven material, I may take advantage of the mechanical strength of relatively long fibres, such as rope fibres, which possess unusually high tensile and bending strengths.

Although I have specifically described a composite plate which may be constructed in accordance with my invention, and pointed out applications therefor, it will be apparent that minor changes may be made in the construction thereof without departing from the spirit of my invention and I desire, therefore, that no limitations shall be imposed except such as are indicated in the appended claims.

I claim as my invention:

1. A self-sustaining gear comprising superimposed layers of woven, twisted strands of paper impregnated with a hardened phenolic condensation product.

2. A self-sustaining gear comprising superimposed layers of woven strands of paper impregnated with a hardened phenolic condensation product and surplus phenolic condensation product in the interstices formed between the woven strands.

3. A method of making composite gears that comprises forming strands of paper, weaving the strands to form sheets of suitable dimensions, impregnating the sheets with a binder, stacking them to form a body of suitable depth, subjecting the body to heat and pressure to compact the material and to harden the binder and cutting teeth in the periphery of the composite plate thus formed.

In testimony whereof, I have hereunto subscribed my name this 29th day of April, 1919.

LOUIS T. FREDERICK.